United States Patent Office 2,982,643
Patented May 2, 1961

2,982,643

NITROCELLULOSE

Charles M. Reinhardt, Herrin, Ill., assignor to Olin Mathieson Chemical Corporation, East Alton, Ill., a corporation of Virginia No Drawing. Filed July 23, 1958, Ser. No. 750,314

1 Claim. (Cl. 52—20)

This invention relates to nitrocellulose and particularly to a method of preparing minute spherical or near-spherical bodies of nitrocellulose.

Various methods for the preparation of spherical and near-spherical particles of nitrocellulose have been previously proposed. Such processes are quite satisfactory in the manufacture of particles having an average diameter between about 0.008 inch and about 0.030 inch. However, they have been exceedingly disappointing in attempted adaptations to the preparation of particles having maximum average diameters of 0.001 inch or less. Spherical nitrocellulose particles of this type have been prepared most successfully by suspending droplets of a water immiscible nitrocellulose lacquer in water and evaporating the solvent from the suspended lacquer particles. Such a process is depicted by the teachings of Olsen, Tibbetts and Kerone in U.S. Patent 2,027,114. Processes of this type are necessarily limited to the production of nitrocellulose spheres within a relatively narrow size range and are not adaptable to the production of spherical particles having an average maximum diameter of about 0.001 inch. Although the desirability of providing a simplified process for the manufacture of exceedingly small nitrocellulose spherical bodies for use as molding powders, constituents for the manufacture of rocket powders, and coating applications has long been recognized, such products have been previously prepared only by processes requiring complex procedural operations or specialized equipment.

It is, therefore, an object of the present invention to provide a novel process for the manufacture of nitrocellulose spheres overcoming the disadvantages of the prior art processes. A more specific object of this invention is to provide a process for the manufacture of spherical nitrocellulose particles having a diameter of about 0.001 inch or less.

In accordance with this invention, these and other objects are accomplished, generally speaking, by adding a flacid water miscible nitrocellulose lacquer to an agitated excess of an aqueous non-solvent medium followed by removal of the solvent from the resultant suspension. More specifically, this invention contemplates the preparation of a lacquer by dissolving one part of nitrocellulose in at least 10 parts of a water miscible solvent and passing a stream of the lacquer into a vessel containing an agitated body of water which can contain suspended or dissolved modifiers. When the stream of lacquer is added to the agitated water, the lacquer is broken up into small particles which are suspended in the water. The lacquer solvent migrates from the suspended globules into the aqueous medium, thus in effect precipitating the nitrocellulose in the form of dense, spherical or near-spherical particles having an average diameter of less than about 0.001 inch. The stream of lacquer can be introduced into the aqueous medium either above or below the liquid level and, if desired, can be sprayed into the water in fine droplet or mist form.

The solvent used can be any volatile water miscible solvent for nitrocellulose. The term "volatile" as used herein designates any solvent having a boiling point less than that of water, i.e., less than 100° C. Volatile solvents must be used in order that they can be removed by distillation or other similar means after the nitrocellulose has been precipitated. The solvent must be readily miscible with or soluble in water to insure the ready migration of the solvent from the suspended lacquer particles into the surrounding aqueous medium. Because of ease of operation and economy, it is preferred to utilize solvents that are highly soluble or completely miscible with water. However, any solvent having an appreciable solubility in water is satisfactory. Thus, ethyl acetate having a water solubility of only 8% at 20° C. can be used by adjustment of the temperature and/or the water-to-lacquer ratio, or by continuous removal of the solvent from the aqueous medium during the lacquer addition to the water. The solvent used can be a single compound or a mixed solvent. Suitable unitary nitrocellulose solvents include acetone, methyl ethyl ketone, methyl acetate and ethyl acetate. A number of binary solvent systems including dioxane-alcohol, methyl ethyl ketone-benzene, ether-alcohol, and methylfuran-alcohol are also applicable. Other nitrocellulose solvent systems can, of course, be used providing they are more volatile than water and are water miscible.

In accordance with this invention, the weight ratio of solvent-to-nitrocellulose in the lacquers must be maintained between about 10:1 and about 20:1 by weight. Thus, the lacquers utilized in the present process have a nitrocellulose content between about 5% and about 10%. When more dilute solutions are utilized, the particle size of the product is inordinately small and recovery of excessive amounts of solvents presents a formidable problem. On the other hand, with lacquers containing more than about 10% nitrocellulose, the process becomes difficult to control and the product obtained is quite large.

In carrying out this invention, the lacquer can be prepared and maintained at any temperature at which the solvent is a liquid. The temperature of the water bath can also vary widely and it is only necessary that it be below the boiling point of the solvent when the lacquer is added thereto. If desired, the process of this invention can be carried out at elevated temperatures and under super-atmospheric pressures. In most instances, however, it is preferred for the sake of convenience and economy that the lacquer and water be at a temperature of approximately 25° C. prior to removal of the solvent by distillation. Generally, the lacquer and water bath are at approximately the same temperature when the lacquer is added to the water, but if desired, the temperature of the water can be above or below the temperature of the lacquer.

The water bath must be agitated to insure that the thin lacquer is broken up into very fine particles. While in most instances the bath will be water, various additives and modifiers can be incorporated therein to alter or enhance the properties of the spherical nitrocellulose particles obtained. Thus, it is generally preferred to incorporate about 1% based on the weight of the water of a protective colloid such as animal glue, gum arabic, starch and the like into the bath. Also, the water can contain emulsified nitrocellulose modifiers such as nitroglycerin and dimethylphthalate. In order to insure proper distribution of the nitrocellulose particles throughout the bath, it must have a weight at least about equal to the weight of the lacquer added thereto. Much larger amounts of water can be used but in the interest of economy and ease of operation, it is preferred that the ratio of water-to-lacquer should not exceed about 5:1.

The invention will be more fully understood by reference to the following specific example of a preferred embodiment thereof. In this embodiment and throughout the application, all proportions are expressed in parts by weight.

In accordance with this preferred embodiment, small diameter substantially spherical nitrocellulose particles were prepared. Approximately 100 parts of fibrous nitrocellulose were added to about 1500 parts of acetone at a temperature of approximately 25° C. About 2 parts of 2-nitrodiphenylamine were also added to the acetone as a stabilizer for the nitrocellulose. The nitrocellulose was added gradually to the acetone which was agitated to expedite the formation of a lacquer. The agitation was continued for about 30 minutes or until a thin, clear lacquer was formed. This lacquer was then gradually added to about 2000 parts of water maintained at a temperature of about 25° C. and containing about 1% dissolved animal glue to deter any tendency of the nitrocellulose particles to coalesce. In order to insure the proper subdivision and distribution of the lacquer particles throughout the water bath, it was maintained in an agitated condition and the lacquer was added in a fine stream at a rate of about 3 parts per minute. Immediately upon contacting the water, the stream of lacquer broke up into a multitude of small lacquer particles. Since the acetone in the lacquer was completely water miscible, it quite rapidly migrated from the lacquer into the surrounding water medium. This migration resulted in the simultaneous precipitation of the nitrocellulose and also the shrinking of the globules due to their loss in volume attributed to the solvent. The agitated bath was maintained at approximately 25° C. for about 30 minutes to insure maximum solvent migration. At the end of this period, the temperature of the water bath containing the suspended nitrocellulose particles was gradually increased over a period of about 60 minutes to about 60° C., and was maintained at this temperature for about 120 minutes to insure complete removal of the acetone from the system. The agitation was maintained throughout this heating period. The resultant nitrocellulose particles and the water were then separated by filtration and the nitrocellulose particles dried.

The product thus obtained consisted of free flowing, substantially spherical solid nitrocellulose particles having an average diameter between about 0.0004 inch and 0.0006 inch and a gravimetric or packing density of about 0.8 gram per cc. Such a product is particularly well adapted for use in the manufacture of rocket propellants or other types of massive propellent grains.

From the foregoing description, those skilled in the art should understand that the invention accomplishes its objects and provides a novel process whereby exceedingly small free flowing spherical bodies of nitrocellulose may be made with facility on a large scale. While a complete embodiment has been disclosed in detail and modifications therein suggested, it is to be understood that the example given is for the purpose of illustrating the invention, and not by way of limitation. It is recognized that those skilled in the art will make appropriate adjustment of the several variables in the process in order to adapt it to the peculiarities of any given operation, and consequently it is to be distinctly understood that the invention is not limited to the examples given, save as indicated in the appended claim.

Having thus described the invention, what is claimed and desired to be secured by Letters Patent is:

A process for the manufacture of solid globules of nitrocellulose having an average diameter of 0.001 inch or less consisting essentially of dissolving one part by weight of nitrocellulose in about 15 parts by weight of acetone to form a lacquer, introducing a stream of the lacquer into about 20 parts by weight of agitated water having about 1% animal glue dissolved therein at a rate of about 3 parts of lacquer per minute, the temperature of the water being below the boiling point of acetone whereby the solid globules are precipitated in the water, maintaining the agitation until the migration of the acetone into the water is substantially complete, elevating the temperature of the water above the boiling point of the acetone to remove the acetone therefrom, and separating the globules from the water.

References Cited in the file of this patent

UNITED STATES PATENTS

| | | |
|---|---|---|
| 2,027,114 | Olsen et al. | Jan. 7, 1936 |
| 2,891,055 | Sloan et al. | June 16, 1959 |

OTHER REFERENCES

Military Explosives TM 9-1910 TO 11A-1-34, April 1955, page 127.